US010976875B2

(12) United States Patent
Hong et al.

(10) Patent No.: US 10,976,875 B2
(45) Date of Patent: Apr. 13, 2021

(54) FINGERPRINT RECOGNIZING SENSOR AND TOUCH SCREEN DEVICE INCLUDING THE SAME

(71) Applicant: SAMSUNG ELECTRONICS CO., LTD., Suwon-si (KR)

(72) Inventors: Seogwoo Hong, Yongin-si (KR); Jinmyoung Kim, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 16/902,941

(22) Filed: Jun. 16, 2020

(65) Prior Publication Data

US 2020/0310571 A1 Oct. 1, 2020

Related U.S. Application Data

(63) Continuation of application No. 15/971,030, filed on May 4, 2018, now Pat. No. 10,719,178.

(30) Foreign Application Priority Data

Aug. 3, 2017 (KR) .................. 10-2017-0098521

(51) Int. Cl.
| G06F 3/044 | (2006.01) |
| G06F 3/041 | (2006.01) |
| G06F 3/047 | (2006.01) |
| G06K 9/00 | (2006.01) |
| G06K 9/22 | (2006.01) |

(52) U.S. Cl.
CPC .............. *G06F 3/044* (2013.01); *G06F 3/041* (2013.01); *G06F 3/047* (2013.01); *G06K 9/0002* (2013.01); *G06K 9/00087* (2013.01); *G06K 9/22* (2013.01); *G06F 2203/04112* (2013.01)

(58) Field of Classification Search
CPC .......... G06F 3/044; G06F 3/041; G06F 3/047; G06F 2203/04112; G06K 9/0002; G06K 9/22; G06K 9/00087
See application file for complete search history.

(56) References Cited

U.S. PATENT DOCUMENTS

| 7,711,158 B2 | 5/2010 | Ahn et al. |
| 9,202,104 B2 | 12/2015 | Abe |
(Continued)

FOREIGN PATENT DOCUMENTS

| JP | 2005-156291 A | 6/2005 |
| JP | 2006-014838 A | 1/2006 |
(Continued)

*Primary Examiner* — Patrick N Edouard
*Assistant Examiner* — Joseph P Fox
(74) *Attorney, Agent, or Firm* — Sughrue Mion, PLLC

(57) ABSTRACT

Provided are a transparent fingerprint recognition sensor and a touch screen device including the transparent fingerprint recognition sensor. The transparent fingerprint recognition sensor includes: a substrate; a plurality of first electrodes disposed on the substrate in a sensing area; an insulating layer disposed on the substrate and covering the plurality of first electrodes; a plurality of second electrodes disposed within the insulating layer in the sensing area; a plurality of first signal lines disposed within the insulating layer in the bezel area; and a plurality of second signal lines disposed on a top surface of the insulating layer, in the bezel area.

20 Claims, 10 Drawing Sheets

(56) References Cited

U.S. PATENT DOCUMENTS

| | | | |
|---|---|---|---|
| 2009/0223722 A1* | 9/2009 | Yang | G06F 3/0445 178/18.01 |
| 2012/0034888 A1 | 2/2012 | De Flaviis | |
| 2012/0326992 A1 | 12/2012 | Yeh | |
| 2014/0176492 A1 | 6/2014 | An et al. | |
| 2014/0307181 A1* | 10/2014 | Tang | G06F 3/044 349/12 |
| 2015/0160754 A1 | 6/2015 | Wenzel | |
| 2016/0004343 A1* | 1/2016 | Gourevitch | G06F 3/0446 345/174 |
| 2016/0091997 A1* | 3/2016 | Ho | G06F 3/044 345/173 |
| 2016/0241552 A1 | 8/2016 | Lindemann | |
| 2016/0350570 A1 | 12/2016 | Han et al. | |
| 2017/0090622 A1 | 5/2017 | Badaye et al. | |
| 2017/0123572 A1 | 5/2017 | Song et al. | |
| 2018/0137333 A1 | 5/2018 | Kim et al. | |
| 2018/0307884 A1 | 10/2018 | Xu et al. | |

FOREIGN PATENT DOCUMENTS

| | | |
|---|---|---|
| JP | 5971089 B2 | 8/2016 |
| KR | 10-2005-0099220 A | 10/2005 |
| KR | 10-2006-0124964 A | 12/2006 |
| KR | 10-0923935 B1 | 10/2009 |

\* cited by examiner

FINGERPRINT RECOGNIZING SENSOR AND TOUCH SCREEN DEVICE INCLUDING THE SAME

CROSS-REFERENCE TO RELATED APPLICATION

This application is a continuation application of U.S. application Ser. No. 15/971,030 filed May 4, 2018, which claims the benefit of Korean Patent Application No. 10-2017-0098521, filed on Aug. 3, 2017, in the Korean Intellectual Property Office, the disclosure of which is incorporated herein in its entirety by reference.

BACKGROUND

1. Field

Apparatuses consistent with exemplary embodiments relate to a fingerprint recognition sensor, and more particularly, to a transparent fingerprint recognition sensor capable of restricting crosstalk between a driving signal line and a data reception line, and a touch screen device including the transparent fingerprint recognition sensor.

2. Description of the Related Art

The desire for personal authentication using unique personal characteristics, such as fingerprints, voice, face, hands, and irises, has increased. Personal authentication is often used for banking devices, access control devices, mobile devices, laptops, and the like. Fingerprint recognition devices for personal authentication have also been employed to protect personal information stored on smart-phones.

Recently, a touch screen device combined with a fingerprint sensor has been suggested to perform both fingerprint recognition and touch sensing on a display panel. To this end, a transparent fingerprint recognition sensor has been developed.

SUMMARY

Additional exemplary aspects will be set forth in part in the description which follows and, in part, will be apparent from the description, or may be learned by practice of the presented exemplary embodiments.

According to an aspect of an exemplary embodiment, a fingerprint recognition sensor includes: a combined area comprising a sensing area configured to generate an electrical fingerprint recognition signal and a bezel area at an edge of the sensing area; and a tracer area extending from the bezel area at an end of the sensing area. The combined area includes: a substrate; a plurality of first electrodes disposed on the substrate in the sensing area; an insulating layer disposed on the substrate and covering the plurality of first electrodes; a plurality of second electrodes disposed within the insulating layer in the sensing area; a plurality of first signal lines disposed within the insulating layer in the bezel area; and a plurality of second signal lines disposed on a top surface of the insulating layer in the bezel area.

The substrate may be transparent, the plurality of first electrodes may each include a transparent conductive material, and the insulating layer may include a transparent insulating material.

The fingerprint recognition sensor may further include: a conductive plug extending, through the insulating layer, from the top surface of the insulating layer to the plurality of first electrodes by perpendicularly penetrating a portion of the insulating layer, wherein the plurality of first electrodes may be electrically connected, respectively, to the plurality of second signal lines through the conductive plug.

The plurality of second electrodes and the plurality of first signal lines may be disposed at a same level within the insulating layer, and the plurality of second electrodes may be electrically connected, respectively, to the plurality of first signal lines.

When viewed from above a top portion of the bezel area in a vertical direction, the plurality of first signal lines may not overlap the plurality of second signal lines.

The tracer area may include: the substrate; the insulating layer disposed on the substrate; the plurality of first signal lines disposed within the insulating layer; one or more first ground lines disposed at a same level as the plurality of first signal lines within the insulating layer; the plurality of second signal lines disposed on the top surface of the insulating layer; and one or more second ground lines disposed on the top surface of the insulating layer.

When viewed from above a top portion of the tracer area in a vertical direction, a first region including the plurality of first signal lines may not overlap a second region including the plurality of second signal lines.

When viewed from above the top portion of the tracer area in the vertical direction, a third region including the one or more first ground lines may partially overlap a fourth region including the one or more second ground lines and the second region. When viewed from above the top portion of the tracer area in the vertical direction, the fourth region may partially overlap the first region, the first region and the third region may be disposed adjacent to each other and may be disposed at a same level, and the second region and the fourth region may be disposed adjacent to each other and may be disposed at a same level.

When viewed from above the top portion of the tracer area in the vertical direction, one of the one or more second ground lines may be disposed between two adjacent second signal lines from among the plurality of second signal lines, and one of the one or more first ground lines may be disposed between two adjacent first signal lines from among the plurality of first signal lines, between one first signal line and one of the one or more second signal lines, which is adjacent to the one first signal line, and between two adjacent second ground lines from among the one or more second ground lines.

The tracer area may include: a plurality of second signal lines disposed within the insulating layer at a same level as the plurality of first signal lines; and a plurality of first signal lines disposed on the top surface of the insulating layer.

The one or more first ground lines may be disposed between the plurality of first signal lines and the plurality of second signal lines within the insulating layer, and the one or more second ground lines may be disposed between the plurality of first signal lines and the plurality of second signal lines, on the top surface of the insulating layer.

The plurality of first signal lines disposed within the insulating layer and the plurality of first signal lines disposed on the top surface of the insulating layer may be misaligned with respect to each other, and the plurality of second signal lines disposed within the insulating layer and the plurality of second signal lines disposed on the top surface of the insulating layer may be misaligned with respect to each other.

The fingerprint recognition sensor may further include an electrode pad area extending from the tracer area, wherein the electrode pad area may include: the substrate; the insulating layer disposed on the substrate; a first electrode pad on the insulating layer; and a second electrode pad on the insulating layer.

The insulating layer may have a stair shape including a first step and a second step which have different heights, the first electrode pad may be disposed on the first step of the insulating layer, and the second electrode pad may be disposed on the second step of the insulating layer.

The first electrode pad may be disposed at a same level as the plurality of first signal lines, and the second electrode pad may be disposed at a same level as the plurality of second signal lines.

According to an aspect of another exemplary embodiment, a fingerprint recognition sensor includes: a combined area comprising a sensing area configured to generate an electrical fingerprint recognition signal; a bezel area on an edge of the sensing area; and a tracer area extending from the bezel area at an end of the sensing area, wherein the sensing area and the bezel area include: a substrate; a plurality of first electrodes disposed on the substrate in the sensing area; a plurality of second signal lines disposed on the substrate in the bezel area; an insulating layer disposed on the substrate and covering the plurality of first electrodes and the plurality of second signal lines; a plurality of second electrodes disposed within the insulating layer in the sensing area; and a plurality of first signal lines disposed within the insulating layer in the bezel area.

The substrate may be transparent, the insulating layer may include a transparent insulating material, and the plurality of first electrodes may include a same metal material as the plurality of second signal lines.

The tracer area may include: the substrate; the plurality of second signal lines disposed on the substrate; one or more second ground lines disposed on the substrate; the insulating layer disposed on the substrate and covering the plurality of second signal lines and the one or more second ground lines; the plurality of first signal lines disposed within the insulating layer; and one or more first ground lines at a same level as the plurality of first signal lines, within the insulating layer.

Also, the fingerprint recognition sensor may further include an electrode pad area extending from the tracer area, and a cross section of the electrode pad area may include: the substrate; a second electrode pad disposed on the substrate; the insulating layer disposed on the substrate; and a first electrode pad disposed on the insulating layer.

According to an exemplary embodiment, there is provided a touch screen device including the fingerprint recognition sensor that has the above structure.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Figure 1:
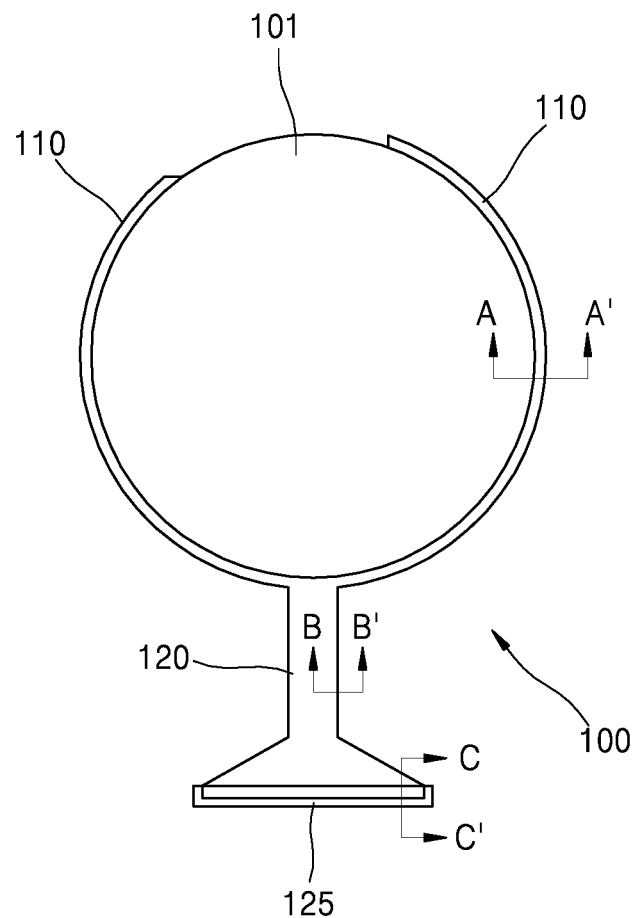
FIG. 1 is a schematic plan view of a structure of a transparent fingerprint recognition sensor, according to an exemplary embodiment.

An electronic device including a touch screen device combined with a fingerprint recognition sensor will now be described more fully with reference to the accompanying drawings, in which exemplary embodiments are shown. Like reference numerals in the drawings denote like elements, and the thicknesses of layers and regions are exaggerated for clarity. The disclosure may be embodied in many different forms and should not be construed as being limited to the exemplary embodiments set forth herein. In addition, it will be understood that, in a layer structure to be described below, when a component is referred to as being "on" or "above" another component, the component may directly contact a top/bottom/left/right portion of the other component, or may be on/under/next to the other component with intervening components therebetween.

Expressions such as "at least one of", when preceding a list of elements, modify the entire list of elements and do not modify the individual elements of the list.

FIG. 1 is a schematic plan view of a structure of a transparent fingerprint recognition sensor 100, according to an exemplary embodiment. Referring to FIG. 1, the transparent fingerprint recognition sensor 100 according to an exemplary embodiment may include a sensing area 101 configured to generate an electrical fingerprint recognition signal, two bezel areas 110, one on each side of the sensing area 101, and a tracer area 120 extending at one end of the sensing area 101 where the two bezel areas 110 meet each other. The transparent fingerprint recognition sensor 100 may further include an electrode pad area 125 extending from the tracer area 120.

The sensing area 101 may include a plurality of electrodes that intersect with one another, for example, electrodes extending in a horizontal direction and electrodes extending in a vertical direction. The sensing area 101 may be configured to recognize a fingerprint in, for example, a mutual capacitance manner. In particular, in the sensing area 101, electrical signals may be generated based on a capacitance that changes according to whether a finger contacts a surface of the sensing area 101. The sensing area 101 may be transparent and thus may perform both a fingerprint recognition function as well as a touch sensing function.

In order for the sensing area 101 to be transparent, lines for transmitting a driving signal provided to the sensing area 101 and for sensing data provided from the sensing area 101 should not be disposed on a rear surface of the sensing area 101. Such opaque lines may cause light loss. Thus, the bezel areas 110 are disposed along an edge (i.e. the periphery) of the sensing area 101, and various lines, for example, first signal lines (135 of FIG. 2) and second signal lines (136 of FIG. 2), may be disposed in the bezel areas 110. For example, the second signal line 136 may be a driving signal line for providing a driving signal to the sensing area 101, and the first signal line 135 may be a data reception line for receiving sensing data from the sensing area 101. However, exemplary embodiments are not limited thereto. That is, the second signal line 136 may be a data reception line, and the first signal line 135 may be a driving signal line. Hereinafter, for convenience, the second signal line 136 is a driving signal line, and the first signal line 135 is a data reception line.

The two bezel areas 110 extending from both edges of the sensing area 101 may connect with each other at one end of the sensing area 101, thus forming the tracer area 120. The electrode pad area 125 is formed on an end of the tracer area 120. The second signal lines 136 and the first signal lines 135 in the bezel areas 110 may be connected to the electrode pad area 125 through the tracer area 120. The sensing area 101 may be electrically connected to a controller (not shown) and a readout circuit (e.g., a readout integrated circuit (IC)) (not shown) of the transparent fingerprint recognition sensor 100 through the tracer area 120 and the electrode pad area 125. For example, a driving signal generated by the controller of the transparent fingerprint recognition sensor 100 may be transmitted to the sensing area 101 through the second signal lines 136 in the tracer area 120 and the bezel areas 110. Also, the sensing data generated in the sensing area 101 may be provided to the readout circuit of the transparent fingerprint recognition sensor 100 through the first signal lines 135 in the tracer area 120 and the bezel areas 110.

Figure 2:
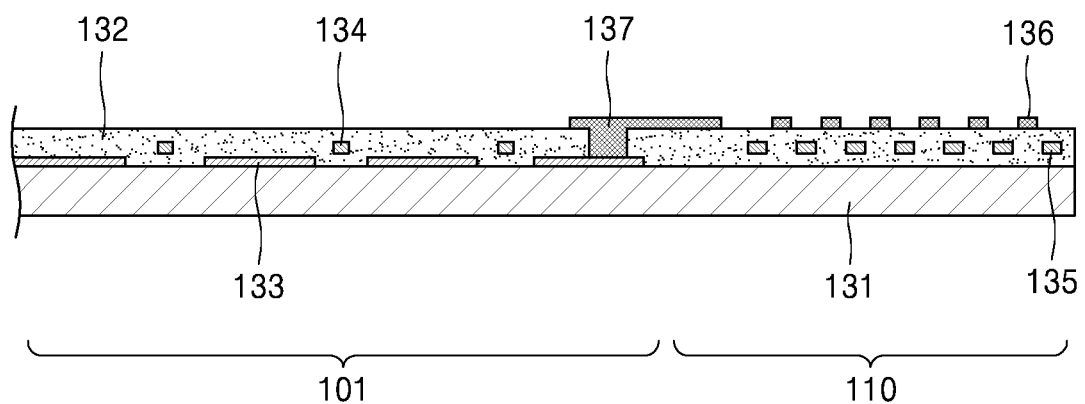
FIG. 2 is a schematic cross-sectional view of a sensing area and a bezel area of the transparent fingerprint recognition sensor of FIG. 1.

FIG. 2 is a schematic cross-sectional view of the sensing area 101 and the bezel area 110 of the transparent fingerprint recognition sensor 100 of FIG. 1. For example, FIG. 2 is a cross-sectional view of the transparent fingerprint recognition sensor 100 taken along a line A-A' of FIG. 1. Referring to FIG. 2, the transparent fingerprint recognition sensor 100 may include a substrate 131 that is transparent, a plurality of first electrodes 133 disposed on the substrate 131 in the sensing area 101, an insulating layer 132 that is transparent and disposed on the substrate 131 to cover the plurality of first electrodes 133, a plurality of second electrodes 134 disposed in the insulating layer 132 in the sensing area 101, a plurality of the first signal lines 135 disposed in the insulating layer 132 in the bezel area 110, and the plurality of second signal lines 136 disposed on a top surface of the insulating layer 132 in the bezel area 110.

The substrate 131 may include a transparent material such as glass. Also, the first electrode 133 may include a transparent conductive material such as indium tin oxide (ITO) or indium zinc oxide (IZO). The first electrodes 133 may be electrically connected to the plurality of second signal lines 136. Thus, driving signals may be transmitted to the first electrodes 133 through the plurality of second signal lines 136. Since the first electrodes 133 and the second signal lines 136 are disposed on different layers, a conductive plug 137 extending from the top surface of the insulating layer 132 to the first electrodes 133 by perpendicularly penetrating a portion of the insulating layer 132 may be further disposed. Then, the first electrodes 133 and the second signal lines 136 may be electrically connected to each other through the conductive plug 137.

The second electrode 134 may include a conductive metal material and may be very thin to decrease light loss. The second electrodes 134 and the first signal lines 135 are buried in the transparent insulating layer 132. That is, the second electrodes 134 and the first signal lines 135 are spaced apart from the substrate 131 in a vertical direction and also from the top surface of the insulating layer 132 in the vertical direction. The second electrodes 134 and the first signal lines 135 may be at the same level in the insulating layer 132. Also, the second electrodes 134 and the first signal lines 135 may include the same metal material and may be electrically connected to each other. Therefore, the sensing data generated in the sensing area 101 may be transmitted from the second electrodes 134 to the first signal lines 135.

As illustrated in FIG. 2, the first signal lines 135 and the second signal lines 136 are disposed at different levels in the bezel area 110. For example, the first signal lines 135 may be disposed within the insulating layer 132, and the second signal lines 136 may be disposed on the top surface of the insulating layer 132. However, the exemplary embodiment is not limited thereto. The second signal lines 136 may be disposed in the insulating layer 132, and the first signal lines 135 may be disposed on the top surface of the insulating layer 132. Therefore, a width of the bezel area 110 may be decreased, as compared to a case in which the first signal lines 135 and the second signal lines 136 are horizontally disposed at the same level.

In order to minimize a parasitic capacitance generated between the first signal lines 135 and the second signal lines 136, which are positioned at different levels from each other with a portion of the insulating layer 132 therebetween, the first signal lines 135 and the second signal lines 136 may be vertically misaligned with respect to each other. That is, when viewed from a top portion of the bezel area 110 in a vertical direction, respective ones of the first signal lines 135 and the second signal lines 136 are parallel to one another and do not overlap one another. Therefore, when viewed from the top portion of the bezel area 110 in the vertical direction, one first signal line 135 may appear between two adjacent second signal lines 136, and one second signal line 136 may appear between two adjacent first signal lines 135.

Figure 3:
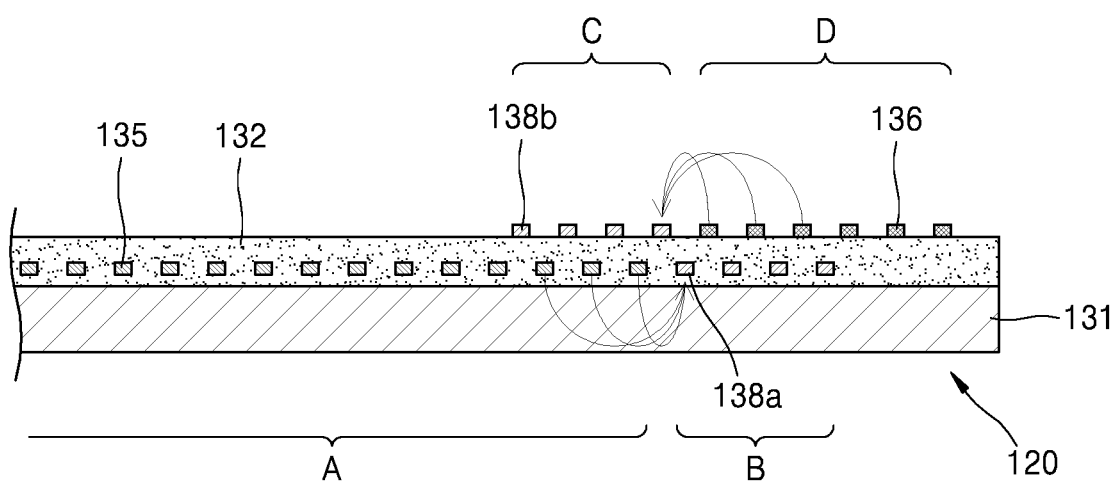
FIG. 3 is a schematic cross-sectional view of a tracer area of the transparent fingerprint recognition sensor of FIG. 1.

FIG. 3 is a schematic cross-sectional view of the tracer area 120 of the transparent fingerprint recognition sensor 100 of FIG. 1. For example, FIG. 3 is a cross-sectional view of the transparent fingerprint recognition sensor 100, taken along a line B-B' of FIG. 1. Referring to FIG. 3, the tracer area 120 may include the transparent substrate 131, the transparent insulating layer 132 that is disposed on the substrate 131, the plurality of first signal lines 135 disposed in the insulating layer 132, at least one first ground line 138a at the same level as the first signal lines 135 in the insulating layer 132, the plurality of second signal lines 136 plurality of on the top surface of the insulating layer 132, and at least one second ground line 138b disposed on the top surface of the insulating layer 132.

As illustrated in FIG. 3, the plurality of first signal lines 135 and the plurality of second signal lines 136 are disposed at different levels in the tracer area 120. For example, the first signal lines 135 may be within the insulating layer 132, and the second signal lines 136 may be on the top surface of the insulating layer 132. Also, the first signal lines 135 and the at least one first ground line 138a may be at the same level in a horizontal direction, and the second signal lines 136 and the at least one second ground line 138b may be at the same level in a horizontal direction. Thus, as compared to a case in which the first signal lines 135 and the second signal lines 136 are horizontally disposed at the same level, a width of the tracer area 120 may be decreased.

According to an exemplary embodiment, when viewed from a top portion of the tracer area 120 in a vertical direction, a horizontal region A including the first signal lines 135 may not overlap a horizontal region D including the second signal lines 136. When viewed from the top portion of the tracer area 120 in the vertical direction, a horizontal region B including the at least one ground line 138*a* may partially overlap a horizontal region C including the at least one second ground line 138*b* and the horizontal region D including the second signal lines 136. Likewise, when viewed from the top portion of the tracer area 120 in the vertical direction, the horizontal region C including the at least one second ground line 138*b* may partially overlap the horizontal region A including the first signal lines 135.

In an exemplary embodiment of FIG. 3, in the insulating layer 132, the horizontal region B including the at least one ground line 138*a* may be adjacent to a right side of the horizontal region A including the first signal lines 135 and may be at the same level as the horizontal region A. On the top surface of the insulating layer 132, the horizontal region D including the second signal lines 136 may be adjacent to a right side of the horizontal region C including the at least one second ground line 138*b* and may be at the same level as the horizontal region C. When viewed from the top portion of the tracer area 120 in the vertical direction, a right portion of the horizontal area A may partially overlap a left portion of the horizontal area C, a left portion of the horizontal area B may partially overlap a right portion of the horizontal area C, and a right portion of the horizontal area B may overlap a left portion of the horizontal area D.

In the above structure, while the sensing data is transmitted through the first signal lines 135, an electrical field generated by the first signal lines 135 mainly affects the first and second ground lines 138*a* and 138*b*, but rarely affects the second signal lines 136. Also, while the driving signals are transmitted through the second signal lines 136, an electrical field generated by the second signal lines 136 mainly affects the first and second ground lines 138*a* and 138*b*, but rarely affects the first signal lines 135. Therefore, crosstalk between the first signal lines 135 and the second signal lines 136 may be suppressed.

In order to minimize a parasitic capacitance generated between the first signal lines 135 and the second ground line 138*b*, each first signal line 135 and each second ground line 138*b* may be vertically misaligned with respect to each other. In other words, when viewed from the top portion of the tracer area 120 in the vertical direction, one second ground line 138*b* may appear disposed between two adjacent first signal lines 135. Likewise, in order to minimize a parasitic capacitance generated between the first ground line 138*a* and the second ground line 138*b* and a parasitic capacitance generated between the first ground line 138*a* and the second signal line 136, the first ground line 138*a* may be vertically misaligned with respect to the second ground line 138*b* and the second signal line 136. For example, when viewed from the top portion of the tracer area 120 in the vertical direction, the first ground lines 138*a* may appear respectively disposed between two adjacent second signal lines 136, between one second signal line 136 and one second ground line 138*b* which are adjacent to each other, and between two adjacent second ground lines 138*b*.

Figure 4:
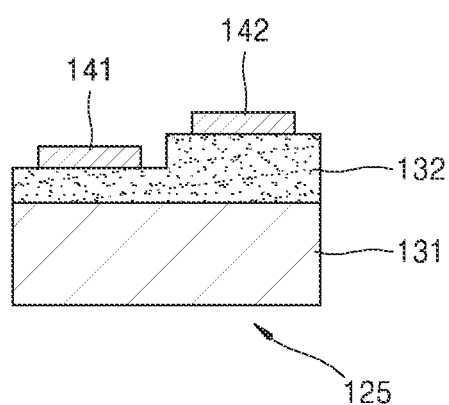
FIG. 4 is a schematic cross-sectional view of an electrode pad area of the transparent fingerprint recognition sensor of FIG. 1.

FIG. 4 is a schematic cross-sectional view of the electrode pad area 125 of the transparent fingerprint recognition sensor 100 of FIG. 1. For example, FIG. 4 is a cross-sectional view of the transparent fingerprint recognition sensor 100, taken along a line C-C' of FIG. 1. Referring to FIG. 4, the electrode pad area 125 may include the transparent substrate 131, the transparent insulating layer 132 that is disposed on the substrate 131, a first electrode pad 141 disposed on the insulating layer 132, and a second electrode pad 142 disposed on the insulating layer 132. The insulating layer 132 may have a stair shape having steps of different heights. The first electrode pad 141 may be disposed on a step having a comparatively low height, and the second electrode pad 142 may be disposed on a step having a comparatively high height. For example, the first electrode pad 141 may be disposed at the same level as the first signal lines 135 and may be electrically connected thereto. The second electrode pad 142 may be disposed at the same level as the second signal lines 136 and may be electrically connected thereto.

FIGS. 5A to 5E are schematic cross-sectional views of a manufacturing process of the transparent fingerprint recognition sensor 100 of FIG. 1. In particular, FIGS. 5A to 5E are cross-sectional views of the transparent fingerprint recognition sensor 100, taken along the line A-A' of FIG. 1.

Figure 5A:
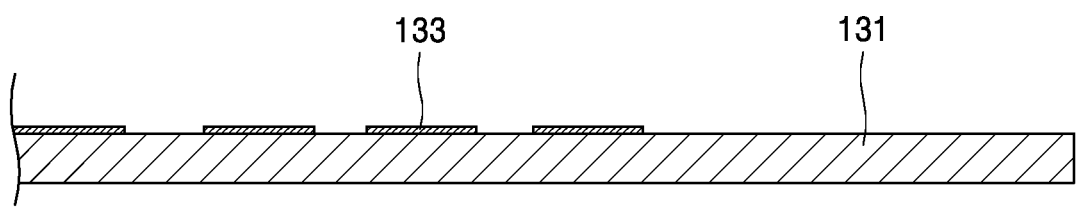
FIGS. 5A, 5B, 5C, 5D, and 5E are schematic cross-sectional views for illustrating a process of manufacturing the transparent fingerprint recognition sensor of FIG. 1.

First of all, referring to FIG. 5A, the transparent first electrodes 133 are formed on the substrate 131 that is as transparent as glass. For example, the first electrodes 133 may be formed by forming ITO or IZO all over a top surface of the substrate 131 and then patterning ITO and IZO through etching.

Figure 5B:
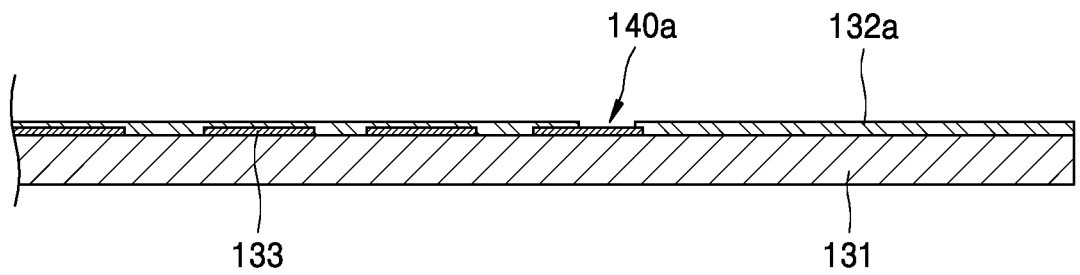

Then, referring to FIG. 5B, a transparent insulating layer 132*a* including, e.g., silicon oxide ($SiO_2$), silicon nitride ($SiN_x$), aluminum oxide ($Al_2O_3$), or the like, is formed on the substrate 131. The transparent insulating layer 132*a* may be formed to fully cover the first electrodes 133. In addition, the transparent insulating layer 132*a* is partially etched to expose a portion of the first electrode 133 to the outside, and a via hole 140*a* penetrating the insulating layer 132*a* may be formed.

Figure 5C:
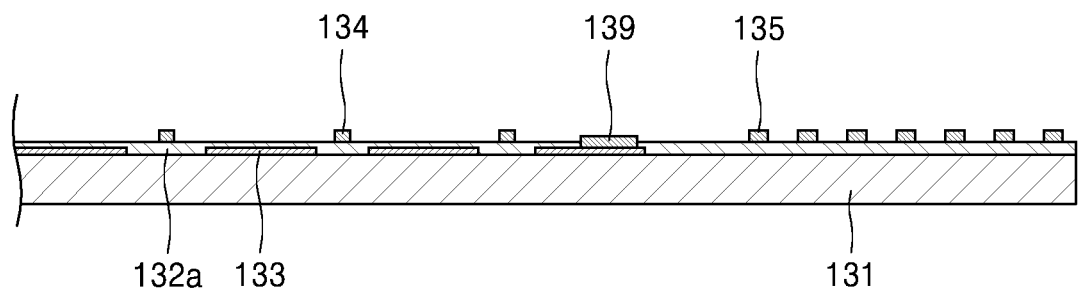

Referring to FIG. 5C, the second electrodes 134 and the first signal lines 135 are formed on the insulating layer 132*a*. For example, the second electrodes 134 and the first signal lines 135 may be simultaneously formed by forming a conductive metal layer on an entire top surface of the insulating layer 132*a* and then patterning the conductive metal layer through etching. Also, although not shown in FIG. 5C, the first ground lines 138*a* of FIG. 3 and the first electrode pad 141 of FIG. 4 may be formed simultaneously with the second electrodes 134 and the first signal lines 135. When the conductive metal layer is formed, the inside of the via hole 140*a* may be filled with metal. When the conductive metal layer is patterned, portions of the conductive metal layer around the via hole 140*a* are removed so that a conductive layer 139 filling the inside of the via hole 140*a* may be formed.

Figure 5D:
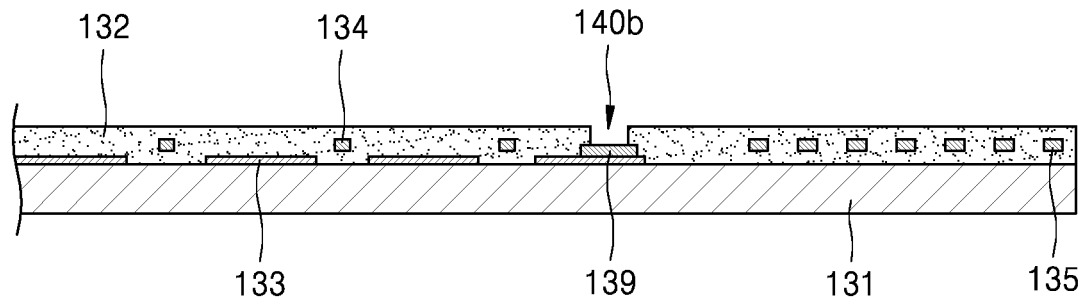

Next, referring to FIG. 5D, the insulating layer 132 may be formed by further stacking an insulating layer to fully cover the second electrodes 134 and the first signal lines 135. Then, the second electrodes 134, the first signal lines 135, and the first electrode pad 141 may be buried in the insulating layer 132. After that, the insulating layer 132 is partially etched to expose the conductive layer 139 to the outside, and a via hole 140*b* penetrating the insulating layer 132 may be formed.

Figure 5E:
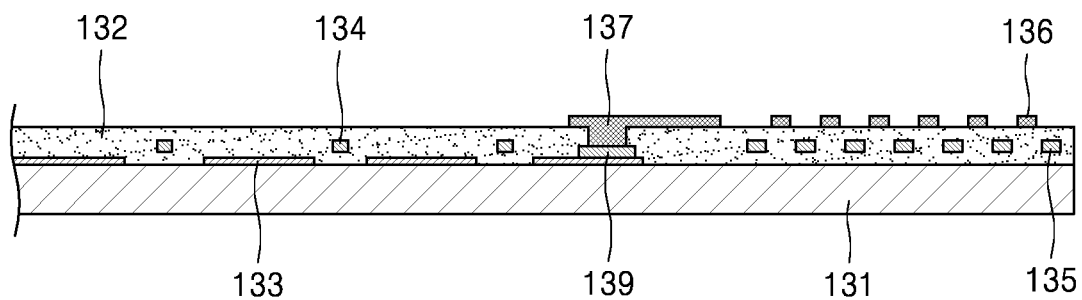

Last, referring to FIG. 5E, the second signal lines 136 are formed on the top surface of the insulating layer 132. For example, the second signal lines 136 may be formed by forming the conductive metal layer on the entire top surface of the insulating layer 132 and then patterning the conductive metal layer through etching. Although not shown in FIG. 5E, the second ground line 138*b* of FIG. 3 and the second electrode pad 142 of FIG. 4 may be formed simultaneously with the second signal lines 136. When the conductive metal layer is formed, the inside of the via hole 140b may be filled with metal. Thus, when the conductive metal layer is patterned, the conductive plug 137 for electrically connecting the first electrodes 133 to the second signal lines 136 may also be formed. Also, although not shown in FIG. 5E, after the second signal lines 136 are formed, a portion of the insulating layer 132, which is on an end of the electrode pad area 125, may be etched to be removed so that the first electrode pad 141 of FIG. 4 may be exposed to the outside.

In the transparent fingerprint recognition sensor 100 according to the above embodiments, since the second signal lines 136 and the first signal lines 135 are disposed to form a two-layer structure, widths and areas of the bezel area 110 and the tracer area 123 may be reduced. Moreover, along with the reduction of the widths and areas of the bezel area 110 and the tracer area 120, crosstalk between the second signal lines 136 and the first signal lines 135 in the bezel area 110 and the tracer area 120 may be effectively suppressed.

Figure 6:
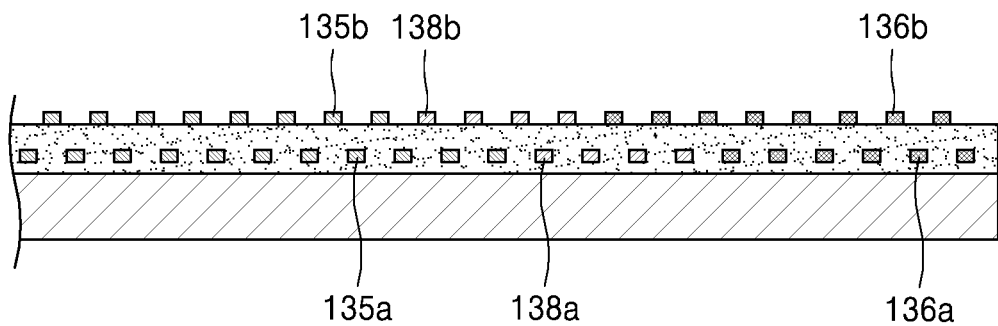
FIG. 6 is a schematic cross-sectional view of a tracer area of a transparent fingerprint recognition sensor, according to another exemplary embodiment.

FIG. 6 is a schematic cross-sectional view of the tracer area 120 of the transparent fingerprint recognition sensor 100, according to another exemplary embodiment. Referring to FIG. 6, the first signal lines 135 and the second signal lines 136 may be disposed to form a two-layer structure. For example, the first signal lines 135 may include first signal lines 135a buried in the insulating layer 132 and first signal lines 135b disposed on the top surface of the insulating layer 132. Also, the second signal lines 136 may include second signal lines 136a buried in the insulating layer 132 and second signal lines 136b disposed on the top surface of the insulating layer 132.

In this case, the first signal lines 135a and the second signal lines 136a, both of which are buried in the insulating layer 132, may be at the same level, and the first signal lines 135b and the second signal lines 136b, both of which are disposed on the top surface of the insulating layer 132, may be at the same level. For example, odd-numbered first signal lines 135a and odd-numbered second signal lines 136a are buried in the insulating layer 132, and even-numbered first signal lines 135b and even-numbered second signal lines 136b may be disposed on the top surface of the insulating layer 132. At least one first ground line 138a may be located between the first signal lines 135a and the second signal lines 136a, both of which are buried in the insulating layer 132, in a horizontal direction. At least one second ground line 138b may be located between the first signal lines 135b and the second signal lines 136b, both of which are disposed on the top surface of the insulating layer 132, in the horizontal direction. In this case, a horizontal area including the first signal lines 135a and 135b does not necessarily overlap a horizontal area including the second signal lines 136a and 136b.

Moreover, in order to minimize a parasitic capacitance generated between the first signal lines 135a buried in the insulating layer 132 and the first signal lines 135b on the top surface of the insulating layer 132, the first signal lines 135a buried in the insulating layer 132 and the first signal lines 135b on the top surface of the insulating layer 132 may be vertically misaligned with respect to each other. Likewise, in order to minimize a parasitic capacitance generated between the second signal lines 136a buried in the insulating layer 132 and the second signal lines 136b on the top surface of the insulating layer 132, the second signal lines 136a buried in the insulating layer 132 and the second signal lines 136b on the top surface of the insulating layer 132 may be vertically misaligned with respect to each other.

Figure 7:
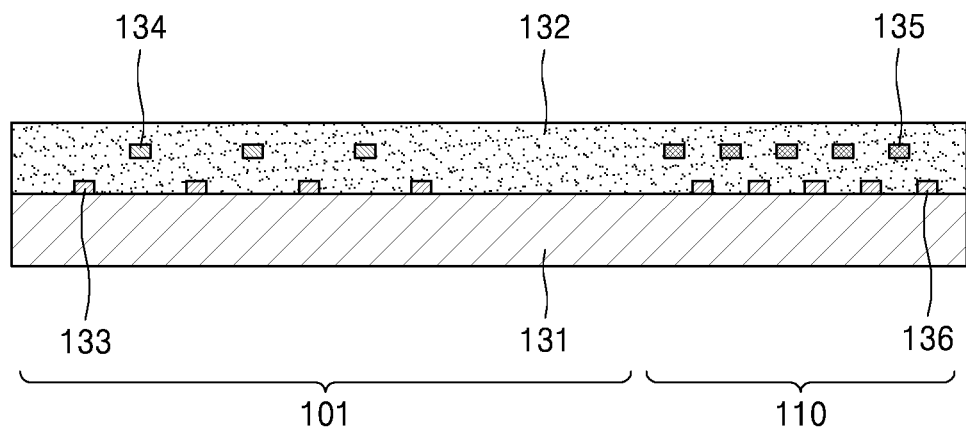
FIG. 7 is a schematic cross-sectional view of a sensing area and a bezel area of a transparent fingerprint recognition sensor according to another exemplary embodiment.

FIG. 7 is a schematic cross-sectional view of a sensing area 101 and a bezel area 110 of a transparent fingerprint recognition sensor according to another exemplary embodiment. Referring to FIG. 7, the transparent fingerprint recognition sensor may include the substrate 131 that is transparent, the first electrodes 133 on the substrate 131 in the sensing area 101, the second signal lines 136 on the substrate 131 in the bezel area 110, the transparent insulating layer 132, disposed on the substrate 131 to cover the first electrodes 133 and the second signal lines 136, the second electrodes 134 in the insulating layer 132 in the sensing area 101, and the first signal lines 135 in the insulating layer 132 in the bezel area 110.

In the case of the transparent fingerprint recognition sensor 100 of FIG. 1, the first electrodes 133 each include a transparent conductive oxide material, and the second signal lines 136 each include a metal material such that the first electrodes 133 and the second signal lines 136 are not at the same level. In contrast, in an exemplary embodiment of FIG. 7, the first electrodes 133 may include the same metal material as the second signal lines 136. Thus, the first electrodes 133 and the second signal lines 136, which are electrically connected to each other, may both be disposed on the top surface of the substrate 131. Thus, the first electrodes 133 and the second signal lines 136 may be simultaneously formed, and there is no need to form the via holes or the conductive plug 137 in order to electrically connect the first electrodes 133 to the second signal lines 136. Accordingly, the manufacturing process of the transparent fingerprint recognition sensor may be simplified. In this case, the first electrodes 133 may be as thin as the second electrodes 134 to reduce light loss.

The descriptions regarding the transparent fingerprint recognition sensor 100 of FIG. 1 may be applied to the exemplary embodiment of FIG. 7. For example, the first signal lines 135 and the second signal lines 136 may be vertically misaligned with respect to each other in order to minimize a parasitic capacitance generated between the first signal lines 135 and the second signal lines 136 which are disposed at different levels from each other with the insulating layer 132 therebetween.

Figure 8:
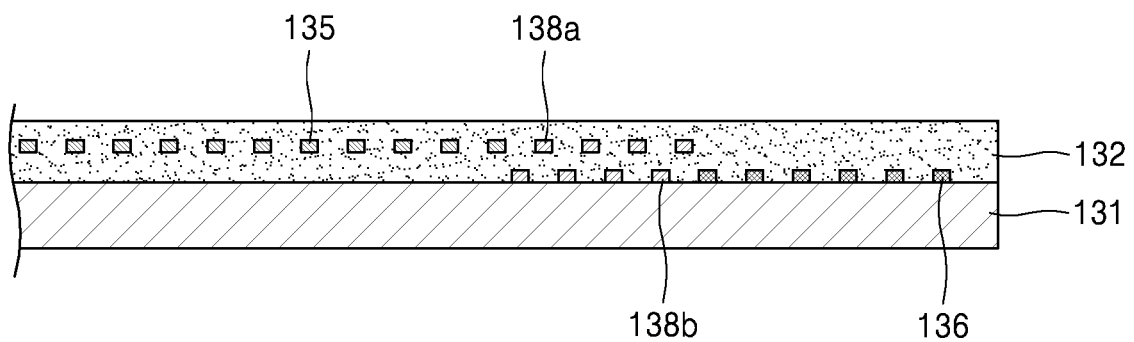
FIG. 8 is a schematic cross-sectional view of a tracer area of the transparent fingerprint recognition sensor of FIG. 7.

FIG. 8 is a schematic cross-sectional view of a tracer area 120 of the transparent fingerprint recognition sensor of FIG. 7. Referring to FIG. 8, the tracer area 120 may include the transparent substrate 131, the second signal lines 136 and at least one second ground line 138b on the substrate 131, the transparent insulating layer 132 disposed on the substrate 131 to cover the second signal lines 136 and the at least one second ground line 138b, the first signal lines 135 disposed in the insulating layer 132, and at least one first ground line 138a at the same level as the first signal lines 135 in the insulating layer 132.

As shown in FIG. 8, the first signal lines 135 and the second signal lines 136 are disposed at different levels in the tracer area 120. For example, the first signal lines 135 may be disposed in the insulating layer 132, and the second signal lines 136 may be disposed on the top surface of the substrate 131. Also, the first signal lines 135 and the at least one first ground line 138a may be horizontally disposed at the same level, and the second signal lines 136 and the at least one second ground line 138b may be horizontally disposed at the same level.

Compared to the exemplary embodiment of FIG. 3, the tracer area 120 of FIG. 8 is different from that of FIG. 3 because the second signal lines 136 and the second ground line 138b are on the top surface of the substrate 131 instead of being on the top surface of the insulating layer 132.

Except for this difference, the descriptions regarding the tracer area 120 of FIG. 3 may be applied to the tracer area 120 of FIG. 8.

Figure 9:
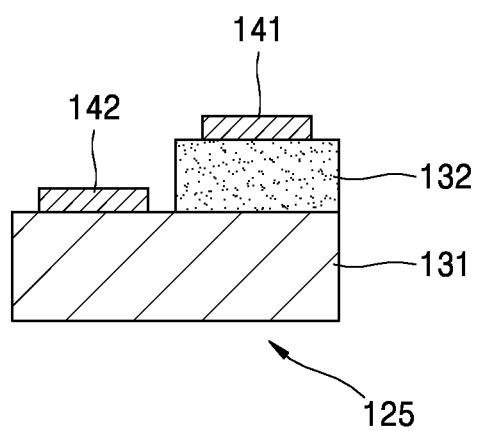
FIG. 9 is a schematic cross-sectional view of an electrode pad area of the transparent fingerprint recognition sensor of FIG. 7.

FIG. 9 is a schematic cross-sectional view of an electrode pad area 125 of the transparent fingerprint recognition sensor of FIG. 7. Referring to FIG. 9, the electrode pad area 125 may include the transparent substrate 131, a second electrode pad 142 that is on the substrate 131, the transparent insulating layer 132 that is on the substrate 131, and the first electrode pad 141 that is on the insulating layer 132. The insulating layer 132 and the second electrode pad 142 are disposed on different portions of the substrate 131. The first electrode pad 141 may be disposed at the same level as the first signal lines 135, and the second electrode pad 142 may be disposed at the same level as the second signal lines 136.

FIGS. 10A to 10D are schematic cross-sectional views of a manufacturing process of the transparent fingerprint recognition sensor of FIG. 7.

Figure 10A:
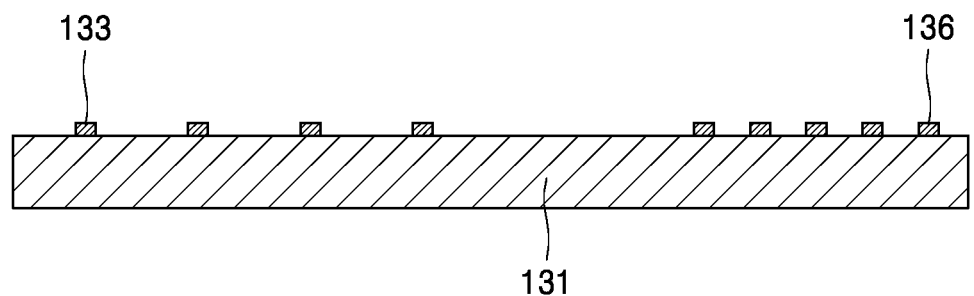
FIGS. 10A, 10B, 10C, and 10D are schematic cross-sectional views for illustrating a process of manufacturing the transparent fingerprint recognition sensor of FIG. 7.

First of all, referring to FIG. 10A, the first electrodes 133 and the second signal lines 136 may be formed on the transparent substrate 131. For example, the first electrodes 133 and the second signal lines 136 may be formed by forming a conductive metal layer on the entire top surface of the substrate 131 and then patterning the conductive metal layer through etching. Also, although not shown in FIG. 10A, the second ground line 138*b* of FIG. 8 and the second electrode pad 142 of FIG. 9 may be formed together with the first electrodes 133 and the second signal lines 136. Therefore, the first electrodes 133, the second signal lines 136, the second ground line 138*b*, and the second electrode pad 142 may be simultaneously formed.

Figure 10B:
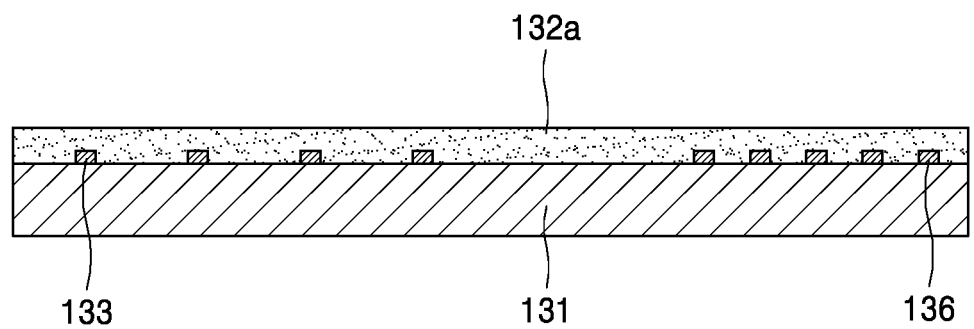

Then, referring to FIG. 10B, a transparent insulating layer 132*a* is formed on the substrate 131. The transparent insulating layer 132*a* may be formed to fully cover the first electrodes 133 and the second signal lines 136. Also, although not shown in FIG. 10B, the transparent insulating layer 132*a* may be formed to cover the second ground line 138*b* of FIG. 8 and the second electrode pad 142 of FIG. 9.

Figure 10C:
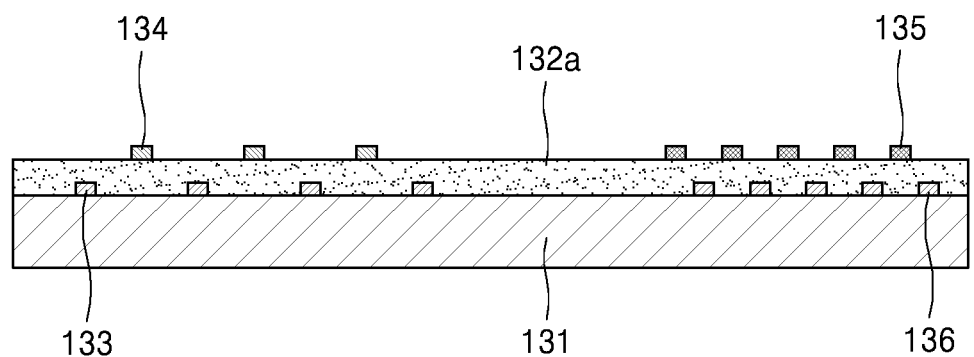

Next, referring to FIG. 10C, the second electrodes 134 and the first signal lines 135 are formed on the transparent insulating layer 132*a*. For example, the second electrodes 134 and the first signal lines 135 may be simultaneously formed by forming a conductive metal layer on an entire top surface of the transparent insulating layer 132*a* and then patterning the conductive metal layer through etching. Also, although not shown in FIG. 10C, the first ground line 138*a* of FIG. 8 and the first electrode pad 141 of FIG. 9 may be formed simultaneously with the second electrodes 134 and the first signal lines 135.

Figure 10D:
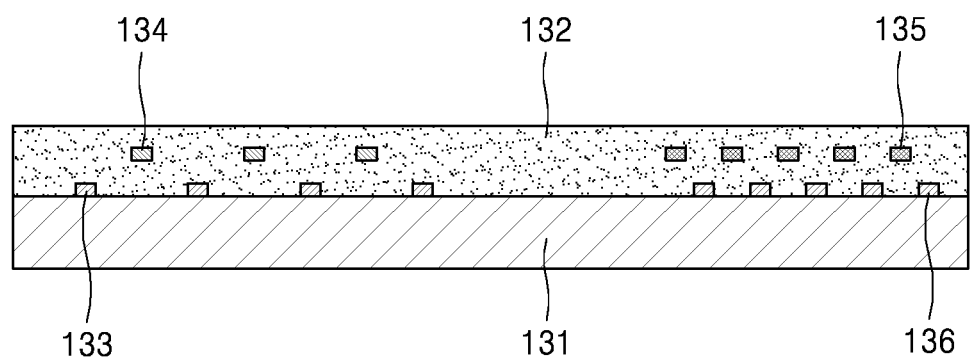

Lastly, referring to FIG. 10D, the insulating layer 132 may be formed by further stacking an insulating layer to fully cover the second electrodes 134 and the first signal lines 135. In this case, the first ground line 138*a* of FIG. 8 and the first electrode pad 141 of FIG. 9 are covered by the insulating layer. A portion of the insulating layer 132, which is on an end of the electrode pad area 125, may be etched to be removed, thereby exposing the first electrode pad 141 and the second electrode pad 142 to the outside.

The above-described fingerprint recognition sensor and touch screen device including the same have been described with reference to the attached drawings showing exemplary embodiments of the present disclosure. It should be understood that embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A fingerprint recognition sensor comprising:
   a combined area comprising a sensing area, configured to generate an electrical fingerprint recognition signal, and a bezel area adjacent to an edge of the sensing area; and
   a tracer area extending from the bezel area,
   wherein the tracer area comprises:
      a substrate;
      an insulating layer disposed on the substrate;
      a first plurality of first signal lines disposed within the insulating layer;
      at least one first ground line disposed within the insulating layer at a same level as the first plurality of first signal lines;
      a first plurality of second signal lines disposed on a top surface of the insulating layer; and
      at least one second ground line disposed on the top surface of the insulating layer,
   wherein, as viewed from above the tracer area, a first region comprising the first plurality of first signal lines does not overlap a second region comprising the first plurality of second signal lines,
   wherein, as viewed from above the tracer area, a third region comprising the at least one first ground line partially overlaps a fourth region comprising the at least one second ground line and partially overlaps the second region, and
   wherein the first region and the third region are adjacent to each other and are disposed at a first level, and the second region and the fourth region are adjacent to each other and are disposed at a second level different from the first level.

2. The fingerprint recognition sensor of claim 1, wherein the combined area comprises:
   the substrate;
   a plurality of first electrodes disposed on the substrate in the sensing area;
   the insulating layer disposed on the substrate and covering the plurality of first electrodes;
   a plurality of second electrodes disposed within the insulating layer in the sensing area;
   the first plurality of first signal lines disposed within the insulating layer in the bezel area; and
   the first plurality of second signal lines disposed on the top surface of the insulating layer in the bezel area.

3. The fingerprint recognition sensor of claim 2, wherein as viewed from above the tracer area, the fourth region partially overlaps the first region,
   wherein the plurality of first electrodes are disposed at a third level,
   wherein the first region and the third region are disposed at the first level that is different from the third level, and
   wherein the second region and the fourth region are disposed at the second level that is different from the third level.

4. The fingerprint recognition sensor of claim 2, wherein:
   the substrate is transparent,
   the plurality of first electrodes each comprise a transparent conductive material, and the insulating layer comprises a transparent insulating material.

5. The fingerprint recognition sensor of claim 2, further comprising:
a conductive plug extending through the insulating layer from the top surface of the insulating layer to the plurality of first electrodes,
wherein the conductive plug electrically connects the plurality of first electrodes to the first plurality of second signal lines.

6. The fingerprint recognition sensor of claim 2, wherein the plurality of second electrodes and the first plurality of first signal lines are disposed at a same level within the insulating layer, and
the plurality of second electrodes are electrically connected to the first plurality of first signal lines.

7. The fingerprint recognition sensor of claim 1, wherein, as viewed from above the bezel area, the first plurality of first signal lines do not overlap the first plurality of second signal lines.

8. The fingerprint recognition sensor of claim 1, wherein, as viewed from above the tracer area, one of the at least one second ground line is disposed between two adjacent second signal lines from among the first plurality of second signal lines, and
one of the at least one first ground line is disposed between two adjacent first signal lines from among the first plurality of first signal lines, between one first signal line and one of the first plurality of second signal lines, which is adjacent to the one first signal line, and between two adjacent second ground lines from among the at least one second ground line.

9. The fingerprint recognition sensor of claim 1, wherein the tracer area further comprises a second plurality of first signal lines and a second plurality of second signal lines,
the second plurality of second signal lines are disposed within the insulating layer at a same level as the first plurality of first signal lines, and
the second plurality of first signal lines are disposed on the top surface of the insulating layer.

10. The fingerprint recognition sensor of claim 9, wherein the at least one first ground line is disposed between the first plurality of first signal lines and the second plurality of second signal lines within the insulating layer, and
the at least one second ground line is disposed between the second plurality of first signal lines and the first plurality of second signal lines, on the top surface of the insulating layer.

11. The fingerprint recognition sensor of claim 9, wherein the first plurality of first signal lines disposed within the insulating layer are misaligned with respect to the second plurality of first signal lines disposed on the top surface of the insulating layer, and
the second plurality of second signal lines disposed within the insulating layer are misaligned with respect to the first plurality of second signal lines disposed on the top surface of the insulating layer.

12. The fingerprint recognition sensor of claim 1, further comprising an electrode pad area extending from the tracer area,
wherein the electrode pad area comprises:
the substrate;
the insulating layer disposed on the substrate;
a first electrode pad on the insulating layer; and
a second electrode pad on the insulating layer.

13. The fingerprint recognition sensor of claim 12, wherein the insulating layer has a stair shape comprising a first step at a first height and a second step at a second height, different from the first height,
the first electrode pad is disposed on the first step of the insulating layer, and
the second electrode pad is disposed on the second step of the insulating layer.

14. The fingerprint recognition sensor of claim 13, wherein the first electrode pad is disposed at a same level as the first plurality of first signal lines, and
the second electrode pad is disposed at a same level as the first plurality of second signal lines.

15. A fingerprint recognition sensor comprising:
a combined area comprising a sensing area, configured to generate an electrical fingerprint recognition signal, and a bezel area adjacent to an edge of the sensing area; and
a tracer area extending from the bezel area,
wherein the tracer area comprises:
a substrate;
a plurality of second signal lines disposed on the substrate;
at least one second ground line disposed on the substrate;
an insulating layer disposed on the substrate covering the plurality of second signal lines and the at least one second ground line;
a plurality of first signal lines disposed within the insulating layer; and
at least one first ground line at a same level as the plurality of first signal lines, within the insulating layer,
wherein, as viewed from above the tracer area, a first region comprising the plurality of first signal lines does not overlap a second region comprising the plurality of second signal lines,
wherein, as viewed from above the tracer area, a third region comprising the at least one first ground line partially overlaps a fourth region comprising the at least one second ground line and partially overlaps the second region, and
wherein the first region and the third region are adjacent to each other and are disposed at a first level, and the second region and the fourth region are adjacent to each other and are disposed at a second level different from the first level.

16. The fingerprint recognition sensor of claim 15, wherein the combined area comprises:
the substrate;
a plurality of first electrodes disposed on the substrate in the sensing area;
the plurality of second signal lines disposed on the substrate in the bezel area;
the insulating layer disposed on the substrate and covering the plurality of first electrodes and the plurality of second signal lines;
a plurality of second electrodes disposed within the insulating layer in the sensing area; and
the plurality of first signal lines disposed within the insulating layer in the bezel area.

17. The fingerprint recognition sensor of claim 16, wherein, as viewed from above the tracer area, the fourth region partially overlaps the first region.

18. The fingerprint recognition sensor of claim 16, wherein the substrate is transparent,
the insulating layer comprises a transparent insulating material, and
the plurality of first electrodes and the plurality of second signal lines comprise a metal material.

19. The fingerprint recognition sensor of claim 16, wherein the plurality of second electrodes and the plurality of first signal lines are disposed at a same level within the insulating layer, and the plurality of second electrodes are electrically connected to the plurality of first signal lines.

20. The fingerprint recognition sensor of claim 15, wherein, as viewed from above the bezel area, the plurality of first signal lines do not overlap the plurality of second signal lines.

* * * * *